Figures 6, 7:
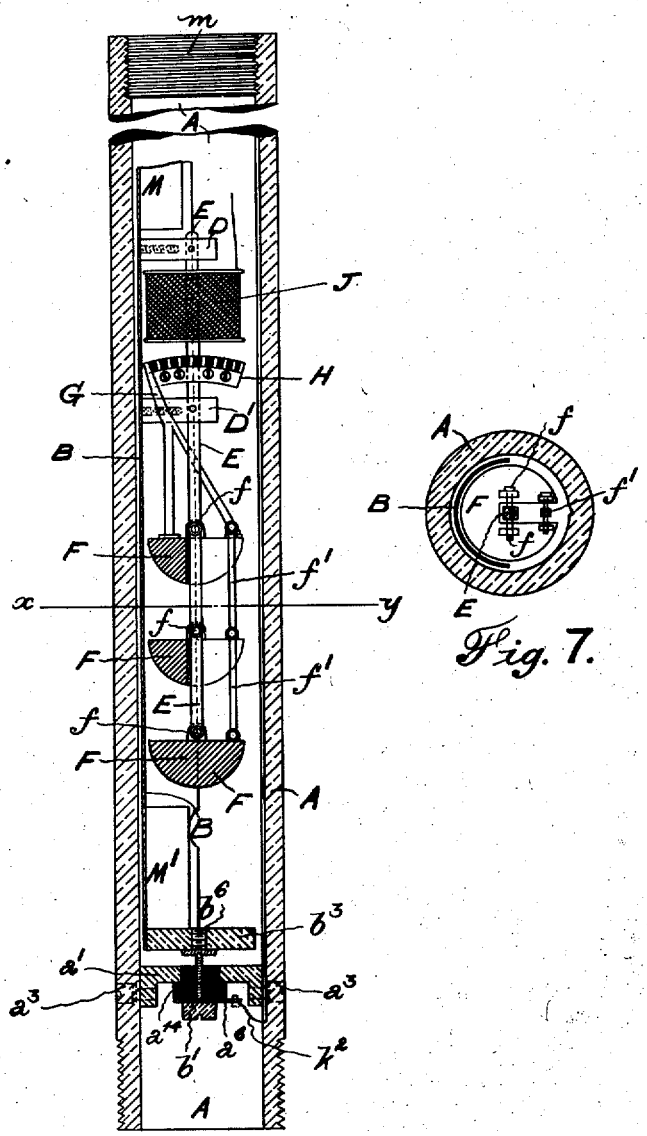

No. 830,730. PATENTED SEPT. 11, 1906.
H. F. MARRIOTT.
MEANS FOR SURVEYING BORE HOLES.
APPLICATION FILED AUG. 30, 1904.
5 SHEETS—SHEET 1.
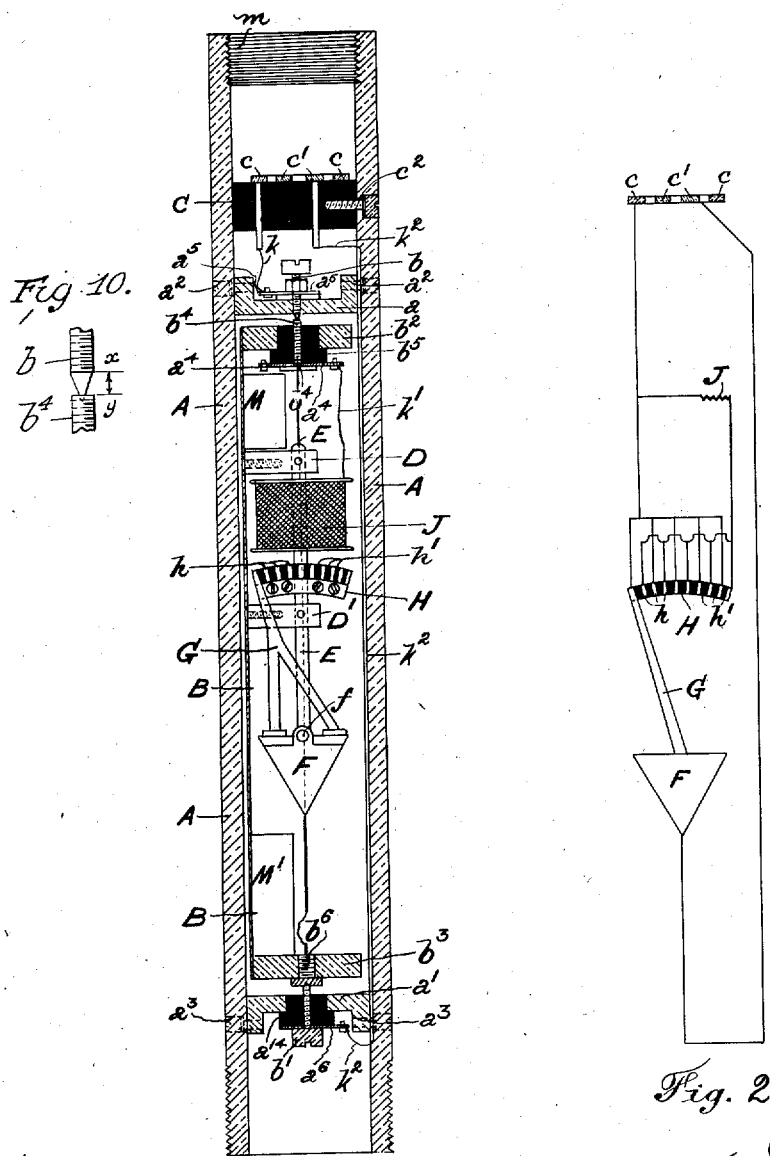

No. 830,730. PATENTED SEPT. 11, 1906.
H. F. MARRIOTT.
MEANS FOR SURVEYING BORE HOLES.
APPLICATION FILED AUG. 30, 1904.
5 SHEETS—SHEET 2.
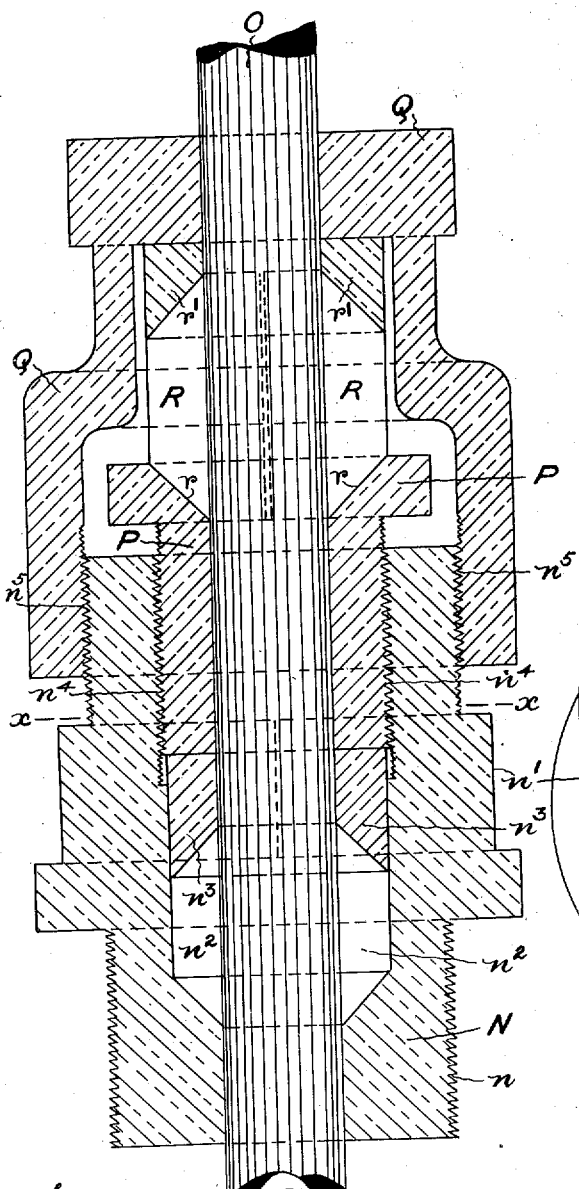
Fig. 3.
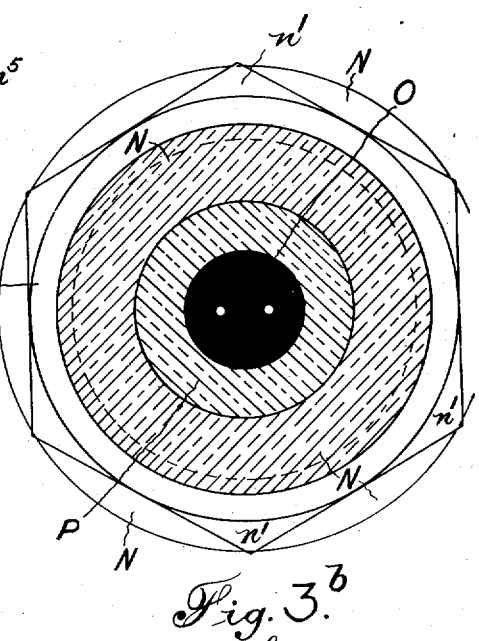
Fig. 3ª.
Fig. 3ᵇ.
Witnesses:
Inventor:
Hugh Frederick Marriott
by Chas. Ovendale
Attorney.

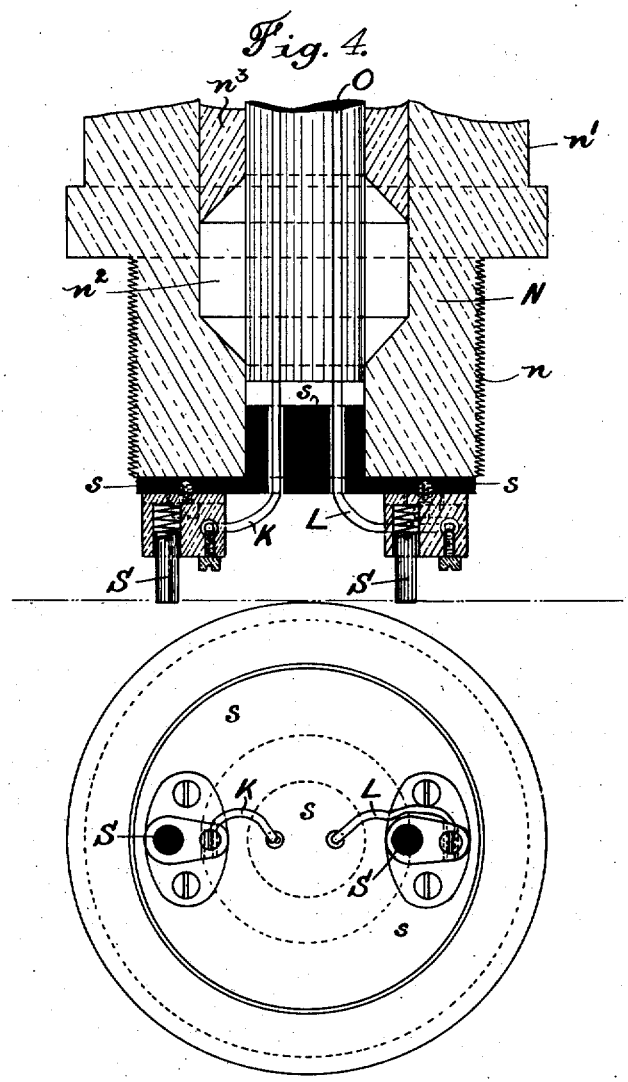

No. 830,730. PATENTED SEPT. 11, 1906.
H. F. MARRIOTT.
MEANS FOR SURVEYING BORE HOLES.
APPLICATION FILED AUG. 30, 1904.

5 SHEETS—SHEET 4.

Witnesses:
Inventor:
Hugh Frederick Marriott
by Chas. Ovendale
Attorney

No. 830,730. PATENTED SEPT. 11, 1906.
H. F. MARRIOTT.
MEANS FOR SURVEYING BORE HOLES.
APPLICATION FILED AUG. 30, 1904.

5 SHEETS—SHEET 5.

Witnesses:
R. Ovendale
F. Ovendale

Inventor:
Hugh Frederick Marriott
by Chas. Ovendale
Attorney

UNITED STATES PATENT OFFICE.

HUGH FREDERICK MARRIOTT, OF PARKTOWN, TRANSVAAL.

MEANS FOR SURVEYING BORE-HOLES.

No. 830,730.                Specification of Letters Patent.                Patented Sept. 11, 1906.

Application filed August 30, 1904. Serial No. 222,776.

*To all whom it may concern:*

Be it known that I, HUGH FREDERICK MARRIOTT, residing at Parktown, near Johannesburg, Transvaal, have invented certain new and useful Improvements in Means for Surveying Bore-Holes, of which the following is a specification.

This invention relates to means for surveying bore-holes, and more particularly to an instrument for determining the amount of dip.

The instruments heretofore employed for the purposes specified have chiefly been designed to take indications or readings by means of liquids which solidify on cooling or solidify by time, and thereby fix the indicators in the positions which they assume at the point to be surveyed. These instruments have proved inadequate for obtaining accurate results, owing to the greater depths to which the bore-holes are now made.

The instruments in which liquids solidifying by cooling are employed have not proved satisfactory at depths exceeding one thousand feet, or thereabout, owing to the extremely-rapid cooling effect of the water in the bore-hole through which the instrument must pass in lowering it to the desired position. The instruments in which the liquids solidifying by time have been employed are a convenient method for obtaining the desired results, but a reliable liquid or solution suitable for the purpose has not been found. The use of liquids solidifying by time have hitherto proved too unreliable and erratic to be of much value. Further, with the existing instruments it has only been possible to obtain intermittent readings—that is to say, it has been necessary to take one indication, then to remove the instrument from the bore-hole and read it, then to lower the instrument into another position to obtain another indication, after which it is again removed in order to read the second indication, and so on until the necessary data or information has been obtained.

Now the object of my invention is to produce an instrument in which electricity may be employed for obtaining the desired information, whereby a complete and continuous reading may be obtained as the instrument is lowered down the bore-hole, which reading may be checked or verified as the instrument is withdrawn from the bore-hole.

The invention will now be described in detail by aid of the accompanying drawings.

Similar characters of reference indicate the same or corresponding parts in the several figures of the drawings.

Figure 8:
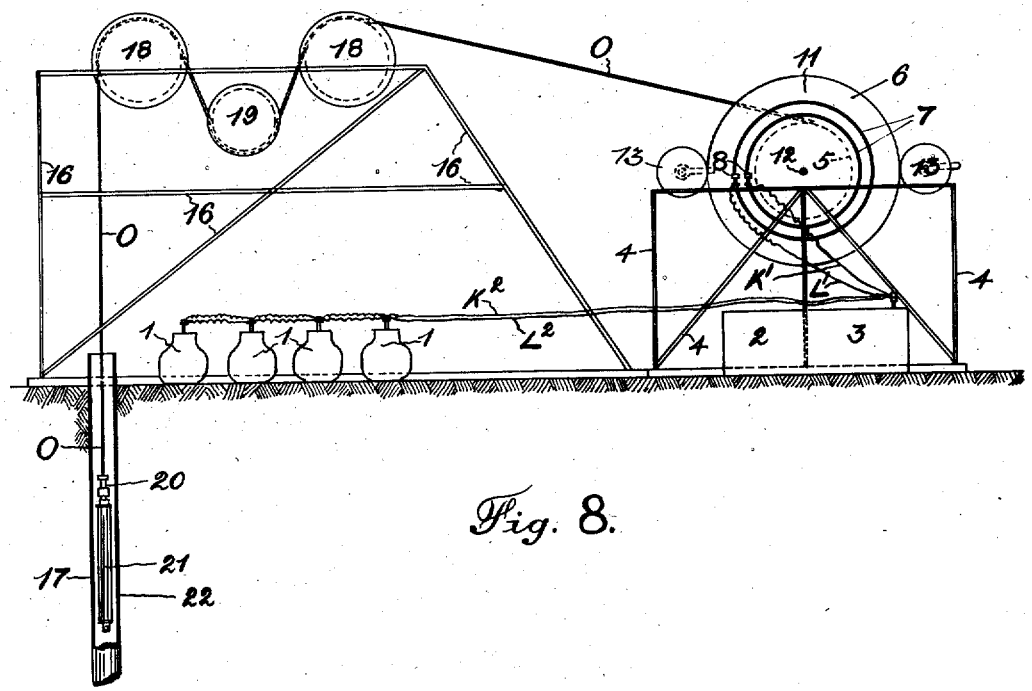
Figure 9:
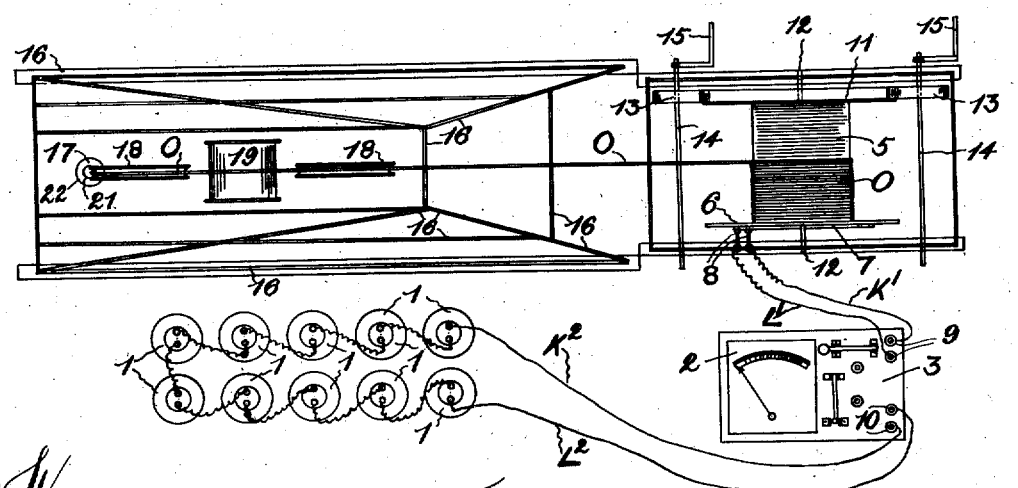

Figure 1 is a vertical section of the instrument. Fig. 2 is a diagrammatic sketch of the electrical connections. Fig. 3 is a vertical section of the cable-head. Fig. 3$^a$ is a plan of the four gripping-pieces which serve to fix the cable-head to the cable. Fig. 3$^b$ is a section of Fig. 3 on line $x\,x$. Fig. 4 is a section of the lower portion of the cable-head, showing the connections with the conductors for the current. Fig. 5 is a plan of the lower end of the cable-head. Fig. 6 is a sectional elevation of a slightly-modified arrangement. Fig. 7 is a plan of Fig. 6 on line $x\,y$. Fig. 8 is an elevation of the general arrangement of the apparatus, and Fig. 9 is a plan of Fig. 8. Fig. 10 is a detail view showing the connection of the screws $b$ and $b^4$.

Referring to Fig. 1, in which I illustrate the instrument, A represents an external cylindrical casing or tube, which may be made of hardened gun-metal or any other suitable material sufficiently thick to effectually withstand the maximum pressure to which it is likely to be subjected when lowered into the bore-hole. Inside the tube A is arranged a hollow hemicylinder B of brass or other suitable metal, which is arranged and supported perpendicularly inside the casing A on two pivot-pins or screws $b\,b'$, so that when the casing A is in a vertical position the movement of the hemicylinder B or interior of the pivoted portion is truly horizontal. Metal plates or disks $a\,a'$, which are secured by means of screws $a^2\,a^3$, screwed through the casing A, serve for carrying the pivot-screws $b\,b'$. The pivot-screw $b'$ in the bottom disk $a'$ is insulated by means of a bush $a^{14}$, of ebonite or other suitable insulating material. In the ends of the hemi-cylinder B are fixed disks $b^2\,b^3$. In the top disk $b^2$ is fixed a screw $b^4$, insulated from the disk by means of the ebonite bush $b^5$. The screw $b^4$ at its upper end is formed with a hole into which the pivot-screw $b$ projects. (See Fig. 10.) The head of the screw $b^4$ serves for attaching below the bush $b^5$ a metal disk or plate $a^4$. In the disk $b^3$ at the other end of the hemicylinder B is fixed the screw $b^6$, which at its lower end is formed with a recess, into which the pivot-screw $b'$ projects. The pivot-screws $b\,b'$ serve for attaching the metal plates or disks $a^5\,a^6$ to the disks $a\,a'$. In the upper end of the tube A is fixed an ebonite disk C, which carries the two contact-rings $c$ $c'$. This disk C may be secured by means of screws $c^2$ screwed into it through the casing. In the inside of the hemicylinder B are fixed brackets D D', which carry or support a vertically-arranged rod or bar E. To the lower end of this bar E is pivoted a weight or plumb-bob F, which is attached to the rod E in such a manner that it can swing freely in one plane only. Attached to the top of the plumb-bob F is a switch-arm G, which carries at its upper end a strip of platinum. The movement of the plumb-bob F causes this switch-arm G to describe an arc or radial path about the pivot $f$ or center of oscillation of the plumb-bob F. Fixed to the vertical rod E is a commutator H, upon which the platinum upper end of the switch-arm G presses gently. The commutator H consists of numerous platinum contacts $h$, interspaced with ebonite pieces $h'$ or other suitable insulating material placed at equal distances apart. Carried by the rod E above the commutator H is a resistance-coil J, which is connected up with the commutator H.

The commutator H is, as shown in Fig. 2, connected up with the resistance-coil J, so that the movement of the switch-arm G first makes a free current, then a blank, then a resistance, then a blank, then a free current, then a blank, then a resistance, and so on. The two wires or conductor K L, (see Fig. 4,) which serve for passing the current of electricity through the instrument, as illustrated in Figs. 8 and 9, may be connected up with a series of primary or secondary cells 1 of ascertained electromotive force, a galvanometer 2, and a standard resistance-box 3. The resistance of the coil J having been previously compared with that of the standard resistance-box 3 the declination of the plumb-bob F from the vertical can be always ascertained by means of the galvanometer 2.

In the general arrangement shown in Figs. 8 and 9, 4 represents a framework for carrying a drum 5, round which the cable O is coiled. To a flange 6 at one end of the drum 5 are fixed two brass or other suitable rings 7, which are electrically connected with the ends of the two conductors K L at the end of the cable O. 8 represents two brushes, which make electrical contact with the rings 7, while permitting the drum 5 to revolve, said brushes 8 being connected by means of the wires K' L' to the terminals 9 of the resistance-box 3. 10 represents the other terminals of the resistance-box 3, which are connected by the wires $K^2$ $L^2$ to the cells 1. The drum 5 is rotated to coil the cable O on or uncoil it off the drum through the medium of a toothed wheel 11, fixed on the shaft or spindle 12 of the drum 5. 13 represents pinions in gear with the wheel 11, and 14 represents shafts on which the pinions 13 are fixed, which shafts 14 are rotated by the cranks 15. 16 is a headgear or framework erected over the bore-hole 17. In this framework 16 are mounted two pulleys 18 and a drum 19, round which the cable O is caused to pass. 20 represents the cable-head fixed to the end of the cable O for attaching the instrument 21, and 22 represents a cylinder of iron or other suitable metal ordinarily fitted in the top of a bore-hole when the hole is formed in soft or friable ground.

The wire $k$ (see Fig. 1) from the concentric ring or terminal $c$ in the top of the casing A is attached to the top pivot-screw $b$ through the medium of the plate or disk $a^5$. This allows the current to pass from the terminal $c$ through the pivot-screw $b$ to the screw $b^4$ and disk or plate $a^4$. This latter disk or plate $a^4$ is connected to the resistance-coil J by means of the wire $k'$. The wire $k^2$ from the other terminal $c'$ is preferably insulated and located in a groove in the casing and attached to the disk or plate $a^6$, fixed to the lower pivot-screw $b'$, so that the current may pass through the lower pivot-screw $b'$, screw $b^6$, and hemicylinder B to the plumb-bob F and switch-arm G.

The hemicylinder B or pivoted portion of the instrument is weighted with segments M M', of lead or other material, fixed in suitable positions, so that their weight combined with that of the main portion of the rest of the instrument operates when the outer case A is tilted in any direction to revolve the hemicylinder B on its pivots $b$ $b'$ and to bring it to rest in the position in which the switch-arm G moves in a vertical plane.

The upper extremity of the casing A is provided with an internal screw-thread $m$, into which is screwed the cable-head, which serves for attaching the instrument to the end of the cable. The cable-head consists of a lower part or plug N, which in its lower portion is formed with an external screw-thread $n$, corresponding to the internal screw-thread $m$ in the top of the casing A. It is also preferably formed externally with a part $n'$ (see Fig. 3$^b$) of hexagonal or other suitable shape for screwing it into the upper end of the casing A. This part of the head is constructed with an internal recess $n^2$ for packing, so as to make a water-tight joint round the cable O and to prevent the ingress of water into the casing A through the cable-head. Inside the recess $n^2$ round the cable O is arranged a ring $n^3$. This ring $n^3$ on the inside is made conical, so that as it is forced down it compresses the packing tightly into the recess $n^2$ round the cable O. The upper end of this plug N is formed with an internal screw-thread $n^4$, into which is screwed the gland-nut P, which serves for forcing down the ring $n^3$ to close the packing tightly round the cable. The upper end of the plug N is also formed with an external screw-thread $n^5$, over which is screwed the cap or nut Q. Inside the cap Q above the top of the gland-nut P are arranged four (more or less) gripping-pieces R, (see Fig. 3ᵃ,) which serve to grip and attach the cable-head and instrument to the cable O. The gripping-pieces R are formed with conical extremities fitting a conical recess r in the top of the gland-nut P at the lower end and projecting into a ring r' at the upper end. By screwing down the cap Q the gripping-pieces R are forced inward between the ring r' and the top of the gland-nut P, and thereby firmly grip the cable.

In Figs. 4 and 5 I show the attachments fitted in the cable-head for making the electrical connections with the contact-rings c c', located in the upper end of the casing A. These consist of two spring contact-pins or terminals S, fixed in an ebonite or other suitable plug or bush s, carried by the lower end N of the cable-head. The terminals S are connected with the conductors or wires K L in any ordinary or suitable manner.

In Figs. 6 and 7 I illustrate a slight modification of the instrument which may be employed to render it more sensitive. In this case I employ three plumb-bobs F, which are pivotally attached to the vertical rod E. The several plumb-bobs F are pivotally connected to each other by means of the connecting-rods f'. Instead of employing three of the plumb-bobs F it will be obvious that any other suitable number may be used. The other parts of the instrument are similar to those described with reference to Fig. 1.

What I claim as my invention, and desire to protect by Letters Patent, is—

1. An instrument for surveying bore-holes comprising a casing, a revoluble portion pivoted on its longitudinal axis in said casing, a plumb-bob pivotally carried by said revoluble portion, the pivot thereof being at right angles to the longitudinal axis of said portion, a switch-arm carried by said plumb-bob, a commutator carried by said revoluble portion over which the switch-arm is caused to travel as the revoluble portion is inclined, said revoluble portion being so weighted that it moves into a position to cause said switch-arm to move in a vertical plane, and means for transmitting the indications of the movements of the switch-arm over the commutator, substantially as described.

2. An instrument for surveying bore-holes comprising a casing, a revoluble portion pivoted on its longitudinal axis in said casing, a plumb-bob pivotally carried by said revoluble portion, the pivot thereof being at right angles to the longitudinal axis of said portion, a commutator fixed to said revoluble portion, a switch-arm fixed to the plumb-bob and adapted to move over the commutator, said revoluble portion being weighted in such manner that it comes to rest in such a position when it is inclined as to cause the switch-arm to move in a vertical plane as it passes over the commutator, and means for transmitting the indications of the movements of said switch-arm over the commutator, substantially as described.

3. In an instrument for surveying bore-holes in combination, a casing, an inner portion revolubly carried by said casing, brackets fixed in said revoluble portion, a rod carried by said brackets, a plumb-bob pivoted to the lower end of said rod, a commutator fixed to said revoluble portion, a switch-arm fixed to the plumb-bob and adapted to traverse said commutator, a resistance-coil carried by the revoluble portion in electrical connection with certain segments of said commutator, said revoluble portion being so weighted that it is caused to assume such a position when the casing is inclined that the switch-arm moves in a vertical plane and over the face of the commutator, and means for transmitting the indications of the movements of the switch-arm over the commutator, substantially as described.

4. In an instrument for surveying bore-holes, in combination, a weighted portion and an outer casing inclosing the same and in which said portion is pivoted, a plumb-bob carried by said pivoted portion, a switch-arm carried by said plumb-bob a commutator, an electric circuit, and a resistance-coil carried by said pivoted portion and arranged so that the declination of the plumb-bob from the vertical and the corresponding movement of the switch-arm on the commutator first makes a free current, then a blank, then a resistance; then a blank, then a free current, then a blank, then a resistance, and so on, substantially as described.

5. In an instrument for surveying bore-holes, in combination an outer casing and an inner pivoted portion, disks fitted in the casing carrying the pivots for the inner portion, a disk of non-conducting material fitted in the upper end of the casing carrying electrical terminals and contact-rings, brackets fitted in the pivoted portion carrying a vertically-disposed rod to which is hinged a plumb-bob carrying a switch-arm, a commutator carried by the vertical rod in conjunction with which the switch-arm operates to indicate the declination of the instrument from the vertical, weights fixed in the pivoted portion to rotate it when the casing is inclined so that the plumb-bob and switch-arm move in a vertical plane, a circuit, and a resistance-coil carried by the pivoted portion and placed in the circuit, substantially as and for the purposes described.

6. In an instrument for surveying bore-holes, a cable-head or device for attaching the instrument to the cable and carrying the electrical spring-contacts, comprising a screw-plug formed with a gland and fitted with a gland-nut for making a water-tight joint round the cable and fitted with a plurality of gripping-pieces and a cap screwed over the end of the plug for tightening the gripping-pieces round the cable, substantially as described.

7. An instrument for surveying bore-holes comprising in combination, a casing, a portion pivoted in said casing on its longitudinal axis, a vertical rod carried by said pivoted portion, a plurality of plumb-bobs pivotally attached to said rod, the pivots thereof being at right angles to the pivots of the said portion and rods or links connecting the several plumb-bobs, substantially as and for the purpose set forth.

In witness whereof I have hereunto set my hand in the presence of two subscribing witnesses.

HUGH FREDERICK MARRIOTT.

Witnesses:
CHAS. OVENDALE,
R. OVENDALE.